United States Patent [19]

Mochida

[11] 4,422,521

[45] Dec. 27, 1983

[54] SAFE REMOTE-CONTROL DOOR OPENING-AND-CLOSING DEVICE FOR AN AUTOMOTIVE VEHICLE

[75] Inventor: Haruo Mochida, Yokohama, Japan

[73] Assignee: Nissan Motor Company, Limited, Yokohama, Japan

[21] Appl. No.: 350,876

[22] Filed: Feb. 22, 1982

[30] Foreign Application Priority Data

May 20, 1981 [JP] Japan .................................. 56-74880

[51] Int. Cl.[3] ............................ B60R 21/00; B60J 5/00

[52] U.S. Cl. .................................... 180/271; 180/286; 49/28

[58] Field of Search ............... 180/286, 274, 281, 282, 180/273, 289; 187/51; 49/324, 27, 26, 28

[56] References Cited

U.S. PATENT DOCUMENTS 2,450,052 9/1948 Marple .................................. 70/264

4,134,050 1/1979 Sibalis .................................... 49/28

4,351,016 9/1982 Felbinger ................................ 49/27

4,365,188 12/1982 Walter .................................... 49/27

*Primary Examiner*—David M. Mitchell

*Assistant Examiner*—Deidre A. Foley

*Attorney, Agent, or Firm*—Schwartz, Jeffery, Schwaab, Mack, Blumenthal & Koch

[57] ABSTRACT

A safe remote-control door opening-and-closing device for an automotive vehicle in which the door can not be opened or closed by a driver from a remote position when a passenger is in an abnormal sitting position, for instance, when he is leaning against the door or when he is getting out of the vehicle. Furthermore, in the safe remote-control device according to the present invention, it is possible to open the door which is currently being closed if the passenger is getting out of the vehicle. The safe remote-control device comprises one or two abnormal sitting position detection switches of the pressure-sensitive type, which are disposed under the trim of the seat near the door, or under the lining on an inner door panel, in addition to the conventional remote-control door opening-and-closing device.

10 Claims, 7 Drawing Figures

SAFE REMOTE-CONTROL DOOR OPENING-AND-CLOSING DEVICE FOR AN AUTOMOTIVE VEHICLE

BACKGROUND OF THE INVENTION

1. Field of the Invention

The present invention relates generally to a safe remote-control door opening-and-closing device for an automotive vehicle and more specifically to a safety device for a remote control door in which the door will not be opened or closed if a passenger is in an abnormal sitting position within the passenger compartment, or in which the door being closed will be opened again if a passenger is between the door and the vehicle.

2. Description of the Prior Art

A remote control door for an automotive vehicle implies a vehicle door which can be opened or closed by the driver, at driver's will, when he operates a control switch disposed at a position remote from the door, irrespective of other passenger's will. The remote control door is usually driven by a door-driving force supplied from a power supply such as an electrical, pneumatic, or hydraulic device.

However, the passenger might be injured if the driver operates the control switch by mistake when the passenger is in an abnormal sitting position, for instance, when a passenger is leaning against the door, puts his legs out of the passenger compartment in order to get out of the vehicle, or is standing between the opened door and the vehicle body. That is, if the control switch is turned on to open the door when the passenger is leaning against the door, he will fall out of the vehicle onto the ground; if the control switch is turned on to close the door when he is standing between the opened door and the vehicle, he will be sandwiched between the vehicle body and the closed door.

SUMMARY OF THE INVENTION

With these problems in mind therefore, it is the primary object of the present invention to provide a safety device for a remote control door opening-and-closing device for an automotive vehicle by which whenever a passenger within the passenger compartment is in an abnormal sitting position, the door can not be opened or closed or is opened reversely against driver's will. This ensures the passengers' safety even if the driver operates the remote control switch without confirmation of safety for the passengers.

To achieve the above-mentioned object, the safe remote-control door opening-and-closing device according to the present invention comprises a one or two abnormal sitting position detection switches of the pressure-sensitive type, which are disposed under the trim of the seat near the door or under the lining of an inner door panel, in addition to the conventional remote-control door opening-and-closing device for an automotive vehicle.

BRIEF DESCRIPTION OF THE DRAWINGS

The features and advantages of the safe remote-control door opening-and-closing device for an automotive vehicle according to the present invention will be more clearly appreciated from the following description taken in conjunction with the accompanying drawings in which like reference numerals designates corresponding elements and in which.

DETAILED DESCRIPTION OF THE PREFERRED EMBODIMENTS

With reference to the attached drawings, the safe remote-control door opening-and-closing device for an automotive vehicle according to the present invention will be described hereinbelow. Further, in this specification, only the safe remote-control device used for a rear, left side vehicle door is disclosed by way of example; however, it is of course possible to adopt this safe remote-control device according to the present invention for the other doors (rear, right side; front, left or right side) of an automotive vehicle.

Figure 1:
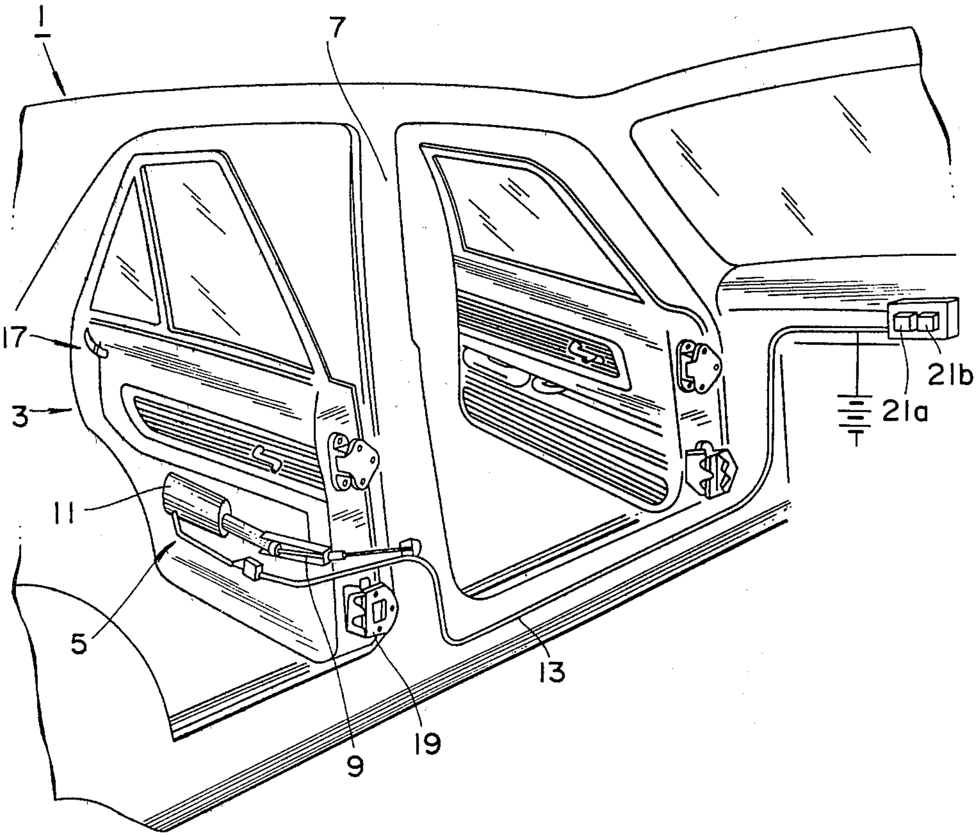
FIG.1 PRIOR ART
FIG. 1 is a pictorial view showing a conventional remote control door opening-and-closing device mounted on the inside of an automotive vehicle rear door.

FIG. 1 helps to illustrate the principle of a prior-art remote-control door opening-and-closing device provided on a door 3 of a vehicle 1. The remote control door device 5 mainly comprises a door open-and-close mechanism 9 such as a hydraulic cylinder linked between the door 3 and a vehicle body 7 for opening and closing the door 3, a driving device 11 such as a DC motor for selectably driving the open-and-close mechanism 9 in the normal direction or in the reverse direction, and a control circuit 13 for selectably rotating the driving device 11 clockwise or counterclockwise. Further, in FIG. 1, the reference numeral 17 denotes an unlock lever linked to the above-mentioned open-and-close mechanism 9 for opening the door 3, and the reference numerals 21*a* and 21*b* are a pair of door open and close switches connected to the control circuit 13.

In the remote control door device 5 thus constructed, when a driver selectively operates the door open and close switches 21*a*, 21*b*, the door 3 is opened or closed, respectively, in response to these switches.

When the door 3 is opened by remote control, since a door lock and a striker (both not shown) engage each time the door is closed, the unlock lever 17 linked to the door open-and-close mechanism 9 must disengage the door lock from the striker, and then the driving device 11 can push the door 3 outward with a hinged portion 19 acting as a fulcrum, by means of the door open-and-close mechanism 9. Also, when the door 3 is closed by remote control, since the door 3 moves into contact with the passenger compartment wall, the door lock and striker automatically engage and therefore the door is locked.

FIG. 2(A) shows various passenger sitting positions, in which M (solid lines) indicates that the passenger is in normal sitting position, $M_1$ (dashed lines) indicates that he is leaning against the door and $M_2$ (dot-dot-dash lines) indicates that he is getting into or out of the vehicle. Further, although not clearly shown in FIG. 2(A), two abnormal sitting position detection switches 15 (hereinafter referred to as abnormal detection switch, simply) are disposed under the rim 25 of a rear seat 23 near the door 3 or under the lining 35 of an inner panel 39 of a rear door 3, as clearly depicted in FIGS. 2(B) and 2(C). In addition, the numeral 27 denotes a seat cushion, the numeral 37 denotes a door cushion.

The abnormal detection switch 15 is of the pressure-sensitive type such as a tape switch, an electrically-conductive rubber switch, etc., which are all closed or opened when a pressure is applied thereto.

These abnormal detection switches 15 are connected to the control circuit 13 in such a way that when one of these switches 15 is opened, the door 3 can either not be opened or not be closed even if the door open and close switches 21*a* and 21*b* are turned on.

Figure 3:
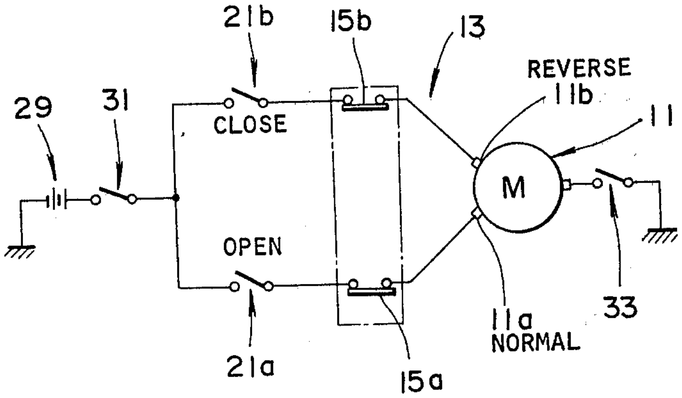
FIG. 3 is a schematic block diagram of a first embodiment of the control unit according to the present invention.

In more detail with reference to FIG. 3, the control circuit 13 comprises a battery 29, an ignition switch 31 connected in series with the battery 29, a door open switch 21*a* connected in series with the ignition switch 31, a door close switch 21*b* connected in parallel with the door open switch 21*a*, a first normally-closed abnormal detection switch contact 15*a* connected in series with the door open switch 21*a*, a second normally-closed abnormal detection switch contact 15*b* connected in series with the door close switch 21*b*, a motor 11 the normal revolution terminal 11*a* of which is connected to the normally-closed abnormal detection switch contact 15*a* and the reverse revolution terminal 11*b* of which is connected to the normally-closed abnormal detection switch contact 15*b*, and a door open-and-close stopper switch 33 connected to the motor 11 for disconnecting the control circuit 13 from the battery 29 when the door 3 is fully closed or fully opened.

The first abnormal detection switch 15*a* is intended to detect abnormal position M1 (leaning against the door) by means of a switch disposed in the door panel or edge of the seat. The second abnormal detection switch 15*b* detects abnormal position M2 (getting out of the vehicle) by way of a seat switch, floor switch, or lower door panel switch.

Now follows a description of the operation of the first embodiment according to the present invention.

In the case of a passenger in a normal sitting position M as shown by the solid lines in FIG. 2(A), the contacts 15*a* and 15*b* of the abnormal detection switch 15 are both closed. Therefore, when the door open switch 21*a* is closed and the ignition switch 31 is on, since voltage is supplied from the battery 29, through the ignition switch 31, the door open switch 21*a*, the contact 15*a*, the normal revolution terminal 11*a* of the motor 11, and the stopper switch 33, to ground, the door 3 is opened by the motor 11 via the door open-and-close mechanism 9. After that, when the door 3 is fully opened, the stopper switch 33 is opened to disconnect the supply voltage from the battery 29.

In contrast, when the door close switch 21*b* is closed, since voltage is supplied from the battery 29, through the ignition switch 31, the door close switch 21*b*, the contact 15*b*, the reverse revolution terminal 11*b* of the motor 11, and the stopper switch 33, to ground, the door 3 is closed by the motor 11 via the door open-and-close mechanism 9. After that, when the door 3 is fully closed, the stopper switch 33 is opened to disconnect the supply voltage from the battery 29 in the same way as described above.

Next, in the case when the passenger is in an abnormal sitting position $M_1$ or $M_2$, as shown by the dashed lines or by the dot-dot-dash lines in FIG. 2(A) ($M_1$ shows the case where the passenger is leaning against the door, and $M_2$ shows the case where he is getting out of the vehicle), the first abnormal detection switch 15*a* is opened in response to the passenger's abnormal sitting position. In this case, even if the door open switch 21*a* is turned on, since the control circuit 13 is cut off because of the opened contact 15*a*, the motor 11 does not rotate, so that the door 3 will not be opened.

Therefore, in case the driver operates the door open switch 21*a* by mistake when the passenger is in such a position, it is possible to prevent the passenger $M_1$ from falling out of the vehicle.

Similarly, in the case of the passenger position $M_2$, even if the door close switch 21*b* is operated by mistake, since the control circuit 13 is cut off by the opened contact 15*b*, the motor 11 does not rotate and, therefore, the door 3 can not be closed. Therefore, it is possible to prevent the door 3 from hitting a passenger who is getting out of the vehicle, thus eliminating the danger of injury. Furthermore, in this embodiment, the door 3 can be closed after the passenger has taken a normal sitting position, that is, after the contact 15*b* has been closed again.

Figure 5:
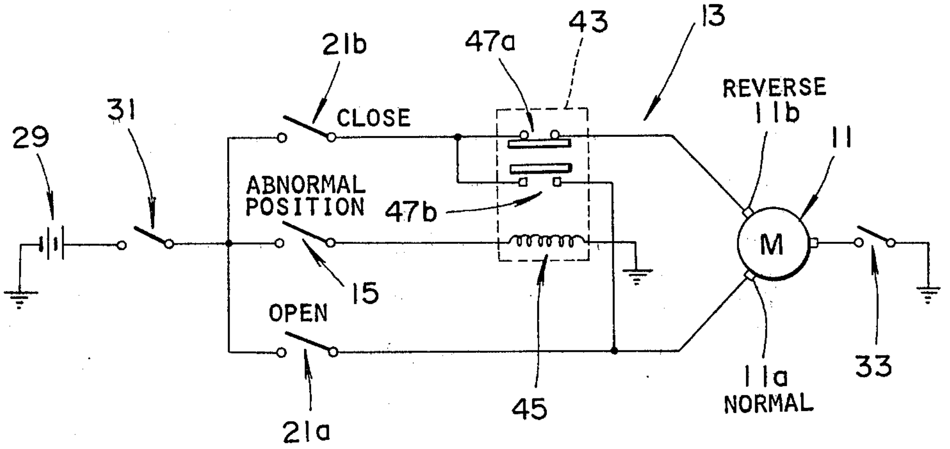
FIG. 5 is a schematic block diagram of a second embodiment of the control unit according to the present invention.
Figure 4:
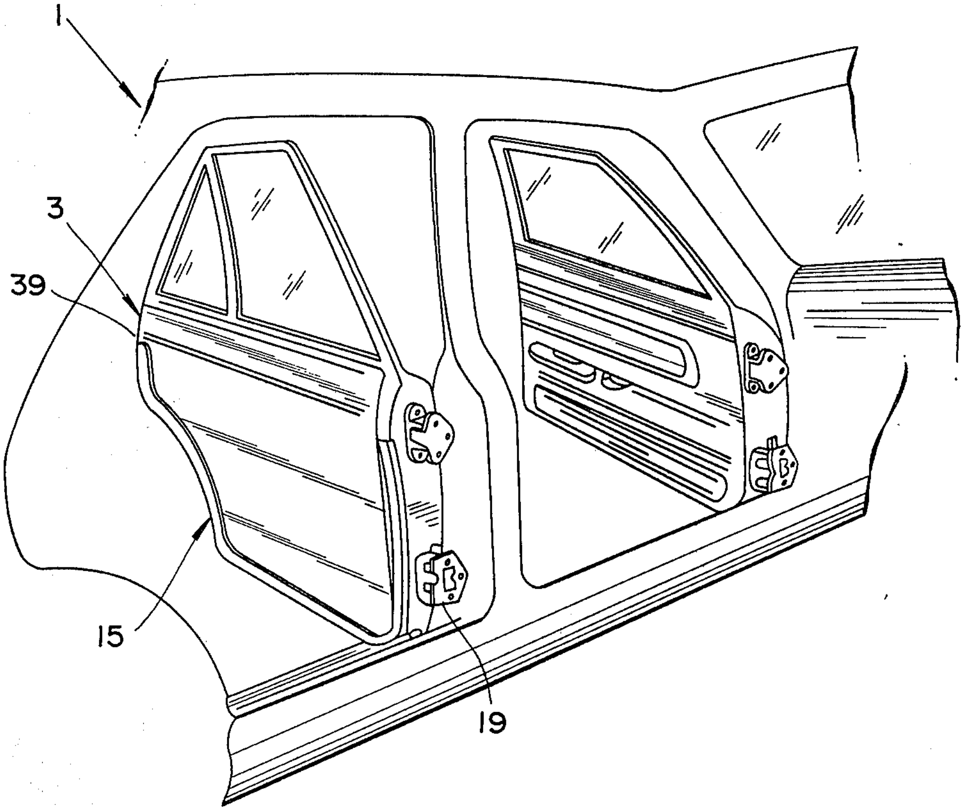
FIG. 4 is a pictorial view showing a second embodiment of arrangement of the abnormal sitting position detection switch according to the present invention in which the abnormal sitting position detection switch is disposed at the corner edge of the door and under the inner panel of the door.

FIGS. 4 and 5 show a second embodiment according to the present invention. In this embodiment, the abnormal detection switch 15 is disposed at an inside corner of the inner panel 39 of the door 3.

In contrast to the first embodiment in which two abnormal detection switches 15*a*, 15*b* are provided in the circuit 13, in this second embodiment, it is possible to use a single-way abnormal detection switch.

In the control circuit 13 of the second embodiment, the abnormal detection switch 15 is connected between the ignition switch 31 and one terminal of a coil 45 of a relay 43. The other terminal of the coil 45 is grounded. The door open switch 21*a* is directly connected to the normal revolution terminal 11*a* of the motor 11. On the other hand, the door close switch 21*b* is connected to the reverse revolution terminal 11*b* of the motor 11 through a normally-closed contact 47*a* of the relay 43. Additionally, a normally-open contact 47*b* of the relay 43 is connected between the door close switch 21*b* and the normal revolution terminal 11*a* of the motor 11.

Now, follows the description of the operation of the second embodiment according to the present invention.

When the door open switch 21*a* is closed while the ignition switch 31 is on, since voltage is supplied from the battery 29, through the ignition switch 31, door open switch 21*a*, motor 11, and the stopper switch 33, to ground, the door 3 is opened via the door open-and-close mechanism 9.

When the door close switch 21*b* is closed, since voltage is supplied from the battery 29, through the ignition switch 31, the door close switch 21*b*, the normally-closed contact 47*a* of the relay 43, the motor 11 and the stopper switch 33, to ground, the door 3 is closed via the door open-and-close mechanism 9.

Figure 2:
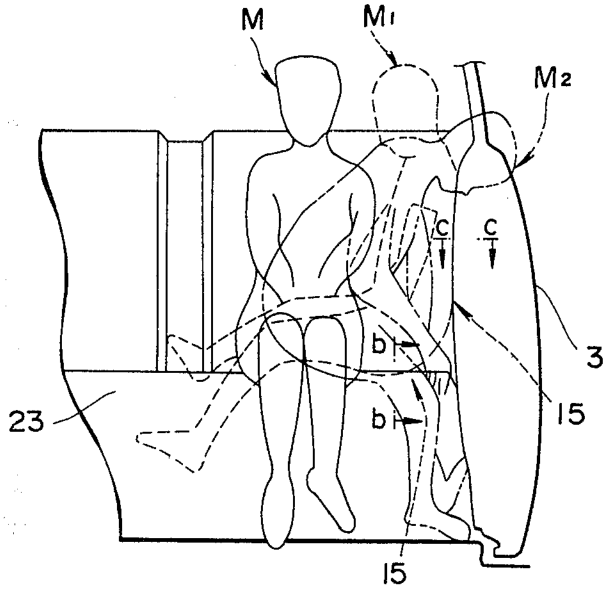
FIG. 2(A) is a pictorial view showing various passenger sitting positions.
FIG. 2(B) is an enlarged cross-sectional view taken along the lines b—b in FIG. 2(A), which shows an abnormal sitting position detection switch implanted under the seat trim.
FIG. 2(C) is an enlarged cross-sectional view taken along the lines c—c in FIG. 2(A), which shows an abnormal sitting position detection switch implanted under the door lining.
Figure 2B:
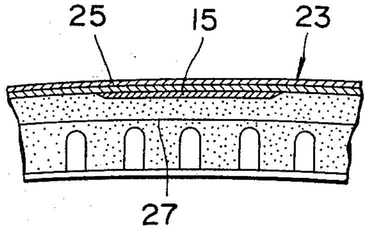
Figure 2C:
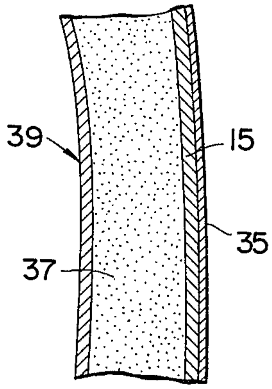

In the case where the passenger is in abnormal sitting position $M_2$ (getting out of the vehicle) in FIG. 2 and the driver operates the door close switch **21*b* by mistake, the door 3 is first closed a little. However, immediately after the door begins closing, since the door 3 hits the passenger and therefore the abnormal detection switch 15 is closed, the relay 45 is energized. That is, the instant the abnormal detection switch 15 is turned on, since current flows through the coil 45 of the relay 43, the normally-closed contact 47*a* of the relay 43 is opened and the normally-open contact 47*b* of the relay 43 is closed. Therefore, the current supplied to the reverse revolution terminal 11*b* of the motor 11 via the normally-closed contact 47*a* is switched so as to be supplied to the normal revolution terminal 11*a* of the motor 11 via the normally-open contact 47*b* which is closed when the relay 43 is energized, in the same way as in the case where the door open switch 21*a* is operated, so that the motor 11 rotates reversely. As a result, the door 3 during closing is instead opened after the abnormal passenger sitting position has been detected, thus protecting the passenger from injury such as might occur if the passenger were sandwiched between the door 3 and the vehicle body 7**.

Further, in this second embodiment, without being limited to the inside corner portion of the inner panel 39, it is possible to dispose the abnormal detection switch 15 at other positions such as on the body sill, door sash portion, etc.

As described above, in the safe remote-control door opening-and-closing device for an automotive vehicle according to the present invention, since there are abnormal sitting position detection switches disposed under the seat trim or in the door lining and since the control circuit for driving the door open-and-close mechanism is switched so as to be disconnected from the power supply or reversed when the detection switch is closed, even if the driver operates the remote control doors by mistake, it is possible to protect the passenger from possible injury such as might occur if the passenger fell out of the vehicle or were sandwiched between the door and the vehicle body, not only while the vehicle is stopped but while the vehicle is travelling, thus resulting in prevention of accidents due to remote control doors and improvement in safety of remote control door opening-and-closing devices.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A safe remote-control door opening-and-closing device for an automotive vehicle for opening and closing a vehicle door from a remote position while protecting passengers from injury, which comprises:

(a) a door open-and-close mechanism linked to the vehicle door for opening and closing the vehicle door;

(b) a driving device linked to said door open-and-close mechanism for driving said door open-and-close mechanism, said driving device being adapted to drive said door open-and-close mechanism in a first normal direction and a second reverse direction;

(c) a door open switch connected in series with said driving device for operating said driving device in the first normal direction;

(d) a door close switch connected in series with said driving device for operating said driving device in the second reverse direction; and (e) an abnormal sitting position detection switch for detecting that one of the passengers is in an abnormal sitting position and for preventing said driving device from driving said door open-and-close mechanism in the first normal direction in response to said door open switch and in the second reverse direction in response to said door close switch when a passenger is detected to be in an abnormal sitting position.

2. A safe remote-control door opening-and-closing device for an automotive vehicle as set forth in claim 1, wherein said abnormal position detection switch comprises:

(a) a first pressure-sensitive switch connected in series between said door open switch and said driving device for preventing said driving device from driving said door open-and-close mechanism in the door-open direction when opened in response to pressure against a position on the vehicle door occupied when a passenger is leaning against the vehicle door; and (b) a second pressure-sensitive switch connected in series between said door close switch and said driving device for preventing said driving device from driving said door open-and-close mechanism in the door-close direction when opened in response to pressure against a position occupied when a passenger is getting in or out of the vehicle.

3. A safe remote-control door. opening-and-closing device for an automotive vehicle as set forth in claim 1, wherein said abnormal sitting position detection switch serves to cause said driving device to drive said door open-and-close mechanism in the door open direction in response to said door close switch and not to drive said door open-and-close mechanism in the door close direction in response to said door open switch.

4. A safe remote-control door opening-and-closing device for an automotive vehicle as set forth in claim 3, wherein said abnormal sitting position switch comprises:

(a) a pressure sensitive switch closing in response to pressure against a position occupied when a passenger is getting in or out of the vehicle; and (b) a normally-closed contact connected in series with said door close switch;

(c) a normally-open contact connected between a point between said door open switch and said driving device and a point between said door close switch and said normally-closed contact; and (d) a relay coil connected in series with said pressure-sensitive switch for opening said normally-closed contact and for closing said normally-open contact when said pressure sensitive switch is closed.

5. A safe remote-control door opening-and-closing device for an automotive vehicle for opening and closing a vehicle door from a remote position while protecting passengers from injury, which comprises:

(a) a door open-and-close mechanism linked to the vehicle door for opening and closing the vehicle door;

(b) a driving device linked to said door open-and-close mechanism for driving said door open-and-close mechanism, said driving device being provided with a normal revolution terminal and a reverse revolution terminal;

(c) a door open switch connected in series with the normal revolution terminal of said driving device for operating said driving device, when closed, in the normal direction that the door is opened;

(d) a door close switch connected in series with the reverse revolution terminal of said driving device for operating said driving device, when closed, in the reverse direction that the door is closed; and (e) an abnormal passenger sitting position detection switch for detecting that one of the passengers is in an abnormal sitting position, which includes:

(1) a first normally-closed contact connected in series with the normal revolution terminal of said driving device and said door open switch, said first contact being opened only when one of the passengers is in an abnormal sitting position; and (2) a second normally-closed contact connected in series with the reverse revolution terminal of said driving device and said door close switch, said second contact being also opened only when one of the passengers is in an abnormal sitting position, whereby the vehicle door can not be opened or closed if the passenger is in an abnormal sitting position.

6. A safe remote-control door opening-and-closing device for an automotive vehicle for opening and closing a vehicle door from a remote position while protecting passengers from injury, which comprises:

(a) a door open-and-close mechanism linked to the vehicle door for opening and closing the vehicle door;

(b) a driving device linked to said door open-and-close mechanism for driving said door open-and-close mechanism, said driving device being provided with a normal revolution terminal and a reverse revolution terminal;

(c) a door open switch connected in series with the normal revolution terminal of said driving device for operating said driving device, when closed, in the normal direction that the door is opened;

(d) a door close switch connected in series with the reverse revolution terminal of said driving device for operating said driving device, when closed, in the reverse direction that the door is closed; and (e) a normally-open abnormal passenger sitting position detection switch for detecting that one of the passengers is in an abnormal sitting position, said abnormal passenger sitting position detection switch being closed only when one of the passengers is in an abnormal sitting position; and (f) a relay including:

(1) a relay coil connected in series with said normally-open abnormal sitting position detection switch and energized when said abnormal detection switch is closed;

(2) a normally-closed contact connected between the reverse revolution terminal of said driving device and said door close switch, said normally-closed contact being opened when said relay coil is energized, that is, when one of the passengers is in an abnormal sitting position; and (3) a normally-open contact connected between the normal revolution terminal of said driving device and said door close switch, said normally-open contact being closed when said relay coil is energized, that is, when one of the passengers is in an abnormal sitting position, whereby the vehicle door which is being closed is opened again if the passenger is in an abnormal sitting position.

7. A safe remote-control door opening-and-closing device for an automotive vehicle as set forth in either claim 5 or 6, wherein said abnormal passenger sitting position detection switch is of pressure-sensitive type.

8. A safe remote-control door opening-and-closing device for an automotive vehicle as set forth in claim 5, wherein said abnormal passenger sitting position detection switch is disposed under a seat trim near the door.

9. A safe remote-control door opening-and-closing device for an automotive vehicle as set forth in either claim 5 or 6, wherein said abnormal passenger sitting position detection switch is disposed under a door lining on an inner door panel.

10. A safe remote-control door opening-and-closing device for an automotive vehicle as set forth in either claim 5 or 6, wherein said abnormal passenger sitting position detection switch is disposed at a corner of an inner panel of the door.

* * * * *